United States Patent
Yamano et al.

(10) Patent No.: US 11,596,858 B2
(45) Date of Patent: Mar. 7, 2023

(54) OPERATING DEVICE AND CONTROL SYSTEM

(71) Applicant: Sony Interactive Entertainment Inc., Tokyo (JP)

(72) Inventors: Ikuo Yamano, Tokyo (JP); Yusuke Nakagawa, Kanagawa (JP); Shinichi Hirata, Kanagawa (JP); Yuichi Machida, Kanagawa (JP); Yoichi Nishimaki, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 84 days.

(21) Appl. No.: 17/096,015

(22) Filed: Nov. 12, 2020

(65) Prior Publication Data

US 2021/0060422 A1  Mar. 4, 2021

Related U.S. Application Data

(63) Continuation of application No. 16/309,526, filed as application No. PCT/JP2017/004978 on Feb. 10, 2017, now Pat. No. 10,881,953.

(30) Foreign Application Priority Data

Jul. 21, 2016  (JP) ................. 2016-143562

(51) Int. Cl.
*A63F 13/285* (2014.01)
*A63F 13/23* (2014.01)
(Continued)

(52) U.S. Cl.
CPC ............ *A63F 13/285* (2014.09); *A63F 13/23* (2014.09); *G06F 3/01* (2013.01); *G06F 3/016* (2013.01);
(Continued)

(58) Field of Classification Search
CPC ........ A63F 13/285; A63F 13/50; A63F 13/98; A63F 2300/302; G06F 3/01; G06F 3/02
See application file for complete search history.

(56) References Cited

U.S. PATENT DOCUMENTS 5,555,894 A  9/1996 Doyama
5,734,373 A  3/1998 Rosenberg
(Continued)

FOREIGN PATENT DOCUMENTS

CN  101610877 A  12/2009
CN  104043246 A  9/2014
(Continued)

OTHER PUBLICATIONS

First Office Action for corresponding CN Application No. 201780044603.3, 21 pages dated Jun. 29, 2021.
(Continued)

*Primary Examiner* — Omkar A Deodhar
(74) *Attorney, Agent, or Firm* — Matthew B. Dernier, Esq.

(57) ABSTRACT

Methods and apparatus provide for a control unit; and an operating device including: (i) operation button to be activated by touch of a user, (ii) a first vibration mechanism for vibrating the operation button, and (iii) a second vibration mechanism for vibrating a main body of the operating device, where the control unit controls the first vibration mechanism and the second vibration mechanism.

13 Claims, 8 Drawing Sheets

(51) Int. Cl.
  *G06F 3/01* (2006.01)
  *G06F 3/02* (2006.01)
  *G06F 3/0338* (2013.01)
  *G06F 3/0346* (2013.01)

(52) U.S. Cl.
  CPC .............. *G06F 3/02* (2013.01); *G06F 3/0338* (2013.01); *G06F 3/0346* (2013.01); *A63F 2300/1025* (2013.01); *A63F 2300/302* (2013.01)

(56) References Cited

U.S. PATENT DOCUMENTS

| | | |
|---|---|---|
| 5,982,354 A | 11/1999 | Arita |
| 5,999,168 A | 12/1999 | Rosenberg |
| 6,380,925 B1 | 4/2002 | Martin |
| 6,468,158 B1 | 10/2002 | Yasuhiro |
| 7,196,688 B2 | 3/2007 | Schena |
| 7,407,439 B1 | 8/2008 | Ochoa |
| 7,890,863 B2 | 2/2011 | Grant |
| 8,059,089 B2 | 11/2011 | Daniel |
| 8,491,388 B2 | 7/2013 | Miyazaki |
| 8,686,961 B2 | 4/2014 | Yamano |
| 9,164,587 B2 | 10/2015 | Da Costa |
| 9,174,134 B1 | 11/2015 | Grant |
| 9,174,344 B2 | 11/2015 | Nahavandi |
| 9,490,088 B2 | 11/2016 | Akira |
| 9,557,830 B2 | 1/2017 | Grant |
| 9,606,569 B2 | 3/2017 | Ueda |
| 9,778,743 B2 | 10/2017 | Grant |
| 9,785,237 B2 | 10/2017 | Shinozaki |
| 9,921,649 B2 | 3/2018 | Grant |
| 10,124,252 B2 | 11/2018 | Grant |
| 10,133,354 B2 | 11/2018 | Grant |
| 10,159,896 B2 | 12/2018 | Strahle |
| 10,185,396 B2 | 1/2019 | Rihn |
| 10,216,278 B2 | 2/2019 | Nakamura |
| 10,226,693 B2 | 3/2019 | Strahle |
| 10,300,778 B2 | 5/2019 | Nomizo |
| 10,353,471 B2 | 7/2019 | Da Costa |
| 10,509,472 B2 | 12/2019 | Grant |
| 10,534,432 B2 | 1/2020 | Okumura |
| 10,632,367 B2 | 4/2020 | Strahle |
| 2001/0002126 A1 | 5/2001 | Rosenberg |
| 2001/0008849 A1 | 7/2001 | Komata |
| 2001/0030146658 A1 | 10/2001 | Rosenberg |
| 2002/0054060 A1 | 5/2002 | Schena |
| 2002/0075233 A1 | 6/2002 | White |
| 2002/0190528 A1 | 12/2002 | Ootori |
| 2004/0113932 A1 | 6/2004 | Rosenberg |
| 2005/0156892 A1 | 7/2005 | Grant |
| 2006/0028095 A1 | 2/2006 | Maruyama |
| 2009/0106655 A1 | 4/2009 | Grant |
| 2009/0131171 A1 | 5/2009 | Miyazaki |
| 2010/0092267 A1 | 4/2010 | Najdovski |
| 2011/0134034 A1 | 6/2011 | Daniel |
| 2012/0026110 A1 | 2/2012 | Yamano |
| 2012/0038468 A1 | 2/2012 | Provancher |
| 2012/0105367 A1 | 5/2012 | Son |
| 2012/0154134 A1 | 6/2012 | Lim |
| 2013/0147610 A1 | 6/2013 | Grant |
| 2013/0265149 A1 | 10/2013 | Nakamura |
| 2013/0267321 A1 | 10/2013 | Burgess |
| 2013/0321273 A1 | 12/2013 | O'Keeffe |
| 2014/0094310 A1 | 4/2014 | Bleich |
| 2014/0139451 A1 | 5/2014 | Levesque |
| 2014/0274398 A1 | 9/2014 | Grant |
| 2014/0305783 A1 | 10/2014 | Akira |
| 2014/0315642 A1 | 11/2014 | Grant |
| 2015/0002416 A1 | 1/2015 | Koike |
| 2015/0035658 A1 | 2/2015 | Provancher |
| 2015/0042461 A1 | 2/2015 | Shinozaki |
| 2015/0097800 A1 | 4/2015 | Grant |
| 2015/0098004 A1 | 4/2015 | Ueda |
| 2015/0130707 A1 | 5/2015 | Da Costa |
| 2015/0133221 A1 | 5/2015 | Danny |
| 2016/0051986 A1 | 2/2016 | Lin |
| 2016/0132114 A1 | 5/2016 | Rihn |
| 2016/0132116 A1* | 5/2016 | Grant ..................... G06F 3/016 345/156 |
| 2016/0259536 A1 | 9/2016 | Kudurshian |
| 2016/0313795 A1 | 10/2016 | Muramatsu |
| 2016/0361639 A1 | 12/2016 | Schmitz |
| 2017/0031442 A1 | 2/2017 | Dabic |
| 2017/0136351 A1 | 5/2017 | Long |
| 2017/0177102 A1 | 6/2017 | Long |
| 2017/0203208 A1 | 7/2017 | Sato |
| 2017/0235364 A1 | 8/2017 | Nakamura |
| 2017/0351394 A1 | 12/2017 | Sumida |
| 2018/0018020 A1 | 1/2018 | Grant |
| 2018/0250587 A1 | 9/2018 | Strahle |
| 2018/0284893 A1 | 10/2018 | Shimizu |
| 2018/0333642 A1 | 11/2018 | Strahle |
| 2019/0025916 A1 | 1/2019 | Okumura |
| 2019/0038968 A1 | 2/2019 | Machida |
| 2019/0118081 A1 | 4/2019 | Strahle |
| 2019/0224565 A1 | 7/2019 | Yamano |

FOREIGN PATENT DOCUMENTS

| | | |
|---|---|---|
| CN | 104107539 | 10/2014 |
| CN | 104798013 A | 7/2015 |
| EP | 0626634 A2 | 11/1994 |
| EP | 0852789 A1 | 7/1998 |
| EP | 1524578 A1 | 4/2005 |
| EP | 2778852 A2 | 9/2014 |
| EP | 2796965 A2 | 10/2014 |
| EP | 2873446 A1 | 5/2015 |
| JP | 7194846 A | 8/1995 |
| JP | 07220563 A | 8/1995 |
| JP | 11514469 A | 12/1999 |
| JP | 2000195370 A | 7/2000 |
| JP | 2003519861 A | 6/2003 |
| JP | 2003330585 A | 11/2003 |
| JP | 2005190465 A | 7/2005 |
| JP | 3686686 B2 | 8/2005 |
| JP | 2006157642 A | 6/2006 |
| JP | 2007330369 A | 12/2007 |
| JP | 2008173186 A | 7/2008 |
| JP | 2008257295 A | 10/2008 |
| JP | 2008257748 A | 10/2008 |
| JP | 2009119125 A | 6/2009 |
| JP | 2010020526 A | 1/2010 |
| JP | 2010146507 A | 7/2010 |
| JP | 2012027875 A | 2/2012 |
| JP | 2012118761 A | 6/2012 |
| JP | 2012128499 A | 7/2012 |
| JP | 2013045230 A | 3/2013 |
| JP | 2013117900 A | 6/2013 |
| JP | 2014174660 A | 9/2014 |
| JP | 2014180572 A | 9/2014 |
| JP | 2014216017 A | 11/2014 |
| JP | 2015011470 A | 1/2015 |
| JP | 2015075912 A | 4/2015 |
| JP | 2015076097 A | 4/2015 |
| JP | 2015111417 A | 6/2015 |
| JP | 2015111542 A | 6/2015 |
| JP | 2015158912 A | 9/2015 |
| JP | 2016001510 A | 1/2016 |
| JP | 2016067667 A | 5/2016 |
| JP | 2016095625 A | 5/2016 |
| JP | 2017508191 A | 3/2017 |
| KR | 20050048902 A | 5/2005 |
| KR | 1020150056070 A | 5/2015 |
| WO | 9712357 A1 | 4/1997 |
| WO | 2005116802 A1 | 12/2005 |
| WO | 2013099742 A1 | 7/2013 |
| WO | 2015092966 A1 | 6/2015 |
| WO | 2016051986 A1 | 4/2016 |
| WO | 2016105496 A1 | 6/2016 |
| WO | 2016114269 A1 | 7/2016 |
| WO | 2017150128 A1 | 9/2017 |
| WO | 2017150129 A1 | 9/2017 |

(56) References Cited

FOREIGN PATENT DOCUMENTS

OTHER PUBLICATIONS

Notice of Reasons for Refusal for related application JP Application No. 2020104664, 10 pages, dated Mar. 29, 2021.
Extended European Search Report application EP Application No. 21159343.9, 11 pages, dated May 21, 2021.
The First Office Action for related CN Application No. 201780044599.0, 20 pages, dated Jun. 4, 2021.
International Search Report for related PCT Application No. PCT/JP2017/004763, 2 pages, dated Apr. 18, 2017.
International Preliminary Report on Patentability and Written Opinion for related PCT Application No. PCT/JP2017/004763, 11 pages, dated Sep. 13, 2018.
International Search Report for related PCT Application No. PCT/JP2017/017909, 7 pages, dated Jul. 18, 2017.
International Search Report for related PCT Application No. PCT/2017/004978, 4 pages, dated Mar. 14, 2017.
International Search Report for related PCT Application No. PCT/JP2017/018914, 2 pages, dated Aug. 22, 2017.
International Preliminary Report on Patentability and Written Opinion for related PCT Application No. PCT/JP2017/017909, 17 pages, dated Feb. 7,2019.
International Preliminary Report on Patentability and Written Opinion for related PCT Application No. PCT/JP2017/018914, 13 pages, dated Feb. 7, 2019.
International Preliminary Report on Patentability and Written Opinion for related PCT Application No. PCT/PCT/2017/004978, 13 pages, dated Jan. 31, 2019.
Notification of Reasons for Refusal for related JP Application No. 2018-528391, 9 pages, dated Apr. 23, 2019.
Extended European Search Report for related EP Application No. 17833789.5, 10 pages, dated May 23, 2019.
Supplementary Search Report for relatedng European Search Report for corresponding Application No. 17833805, 12 pages, dated Jul. 19, 2019.
Decision of Refusal for related Japanese Patent Application No. 2018-528391, 10 pages, dated Jul. 9, 2019.
Extended European Search Report for related European Application No. 17759599.8, 7 pages, dated Sep. 9, 2019.
Korean Office Action for related Application No. 1020197002594, 11 pages, dated Sep. 18, 2019.
Extended European Search Report for corresponding Application No. 17833805.9, 14 pages, dated Nov. 6, 2019.
Notification of Reasons for Refusal for corresponding Application No. JP2018-529371, 9 pages, dated Oct. 29, 2019.
International Search Report for corresponding PCT Application No. PCT/JP2017/035570, 8 pages, dated Dec. 26, 2017.
Office Action for corresponding Korean Application No. 10-2019-7002594, 10 pages, dated Mar. 26, 2020.
International Search report for related application PCT/JP2017/038937, 4 pages, dated Jan. 30, 2018.
International Preliminary Report on Patentability and Written Opinion for related PCT Application No. PCT/JP2017/035570, 20 pages, dated Apr. 9, 2020.
International Preliminary Report on Patentability and Written Opinion for related PCT Application No. PCT/JP2017/038937, 14 pages, dated May 7, 2020.
Notice of Reason for Refusal for corresponding JP Application No. 2019-214619, 6 pages, dated Sep. 2, 2020.
Notice of Reason for Refusal for corresponding JP Application No. 2019-184529, 10 pages, dated Sep. 2, 2020.
Notice of Reason for Refusal for corresponding JP Application No. 2019-221160, 6 pages, dated Sep. 18, 2020.
Notice of Reasons for Refusal for related application JP Application No. 2019549971, 8 pages, dated Apr. 20, 2021.
Office Action for corresponding JP Application No. 2021-099339, 8 pages, dated Jun. 16, 2022.

\* cited by examiner

OPERATING DEVICE AND CONTROL SYSTEM

CROSS REFERENCE TO RELATED APPLICATIONS

This is a continuation application of U.S. patent application Ser. No. 16/309,526, accorded a filing date of Dec. 13, 2018 (allowed), which is a national stage application of International Application No. PCT/JP2017/004978, filed Feb. 10, 2017, which claims priority to JP Application No. 2016-143562, filed Jul. 21, 2016, the entire disclosures of which are hereby incorporated by reference.

TECHNICAL FIELD

The present invention relates to a console device having operating buttons for accepting user's actions, a control system including such a console device, a control device, a control method, and a control program for controlling such a console device.

BACKGROUND ART

Console devices for home-use game machines detect movements such as button depressions, device swings, etc. made by the user and send information representing user's movements to a main game machine unit. Some of such console devices include a vibrating mechanism, such as a vibration actuator, for vibrating a main console device body.

SUMMARY

Technical Problems

According to the conventional art described above, since the console device is vibrated merely in its entirety, its vibrations are presented to the user in a limited manner.

The present invention has been made under the above circumstances. It is an object of the present invention to provide a console device capable of presenting vibrations to the user in a manner different from the conventional art, a control system including such a console device, a control device, a control method, and a control program for controlling such a console device.

Solution to Problems

A control system according to the present invention includes a console device having an operating button to be operated by a user and a vibrating mechanism configured to vibrate the operating button, and a control device configured to control vibrations produced by the vibrating mechanism.

A console device according to the present invention includes an operating button to be operated by a user, and a vibrating mechanism configured to vibrate the operating button.

A control device according to the present invention for controlling a console device including an operating button to be operated by a user, and a vibrating mechanism configured to vibrate the operating button, includes an acquiring unit configured to acquire an amount of operation of the operating button, and a controller configured to vibrate the vibrating mechanism according to control contents depending on the amount of operation of the operating button.

A control method according to the present invention for controlling a console device including an operating button to be operated by a user, and a vibrating mechanism configured to vibrate the operating button, includes a step of acquiring an amount of operation of the operating button, and a step of vibrating the vibrating mechanism according to control contents depending on the amount of operation of the operating button.

A program according to the present invention for controlling a console device including an operating button to be operated by a user and a vibrating mechanism configured to vibrate the operating button, enables a computer to function as an acquiring unit configured to acquire an amount of operation of the operating button, and a controller configured to vibrate the vibrating mechanism according to control contents depending on the amount of operation of the operating button. The program may be computer-readable and stored in a non-transitory information storage medium, and provided therefrom.

DESCRIPTION OF EMBODIMENT

An embodiment of the present invention will be described below with reference to the drawings. In the description that follows, the sizes of various parts, the ratios and layout thereof, and so on are by way of example, and the present embodiment is not limited to the illustrated sizes, ratios, and layout.

Figure 1:
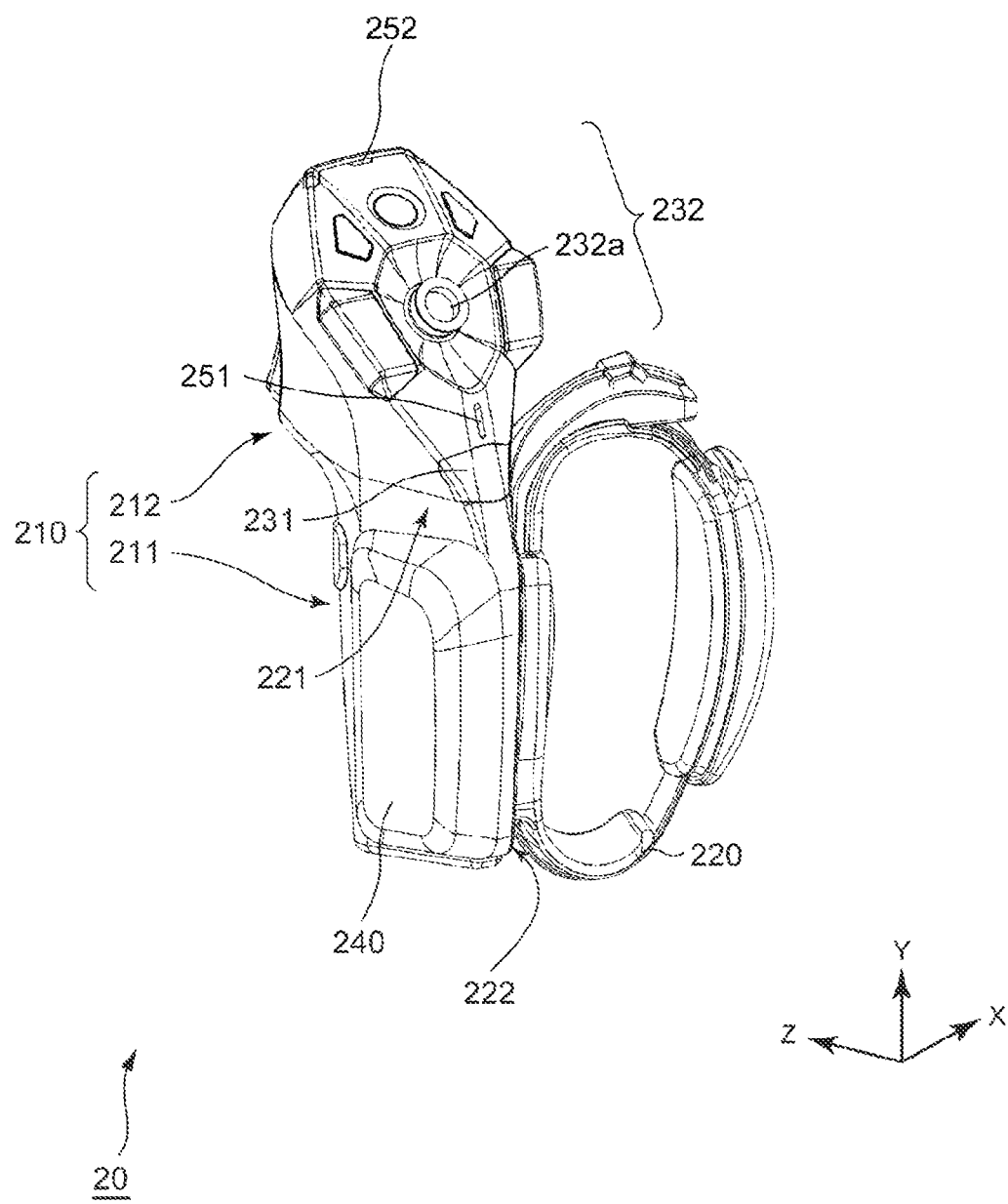
FIG. 1 is a perspective view of a console device according to an embodiment of the present invention, illustrating a front side of the console device.
Figure 2:
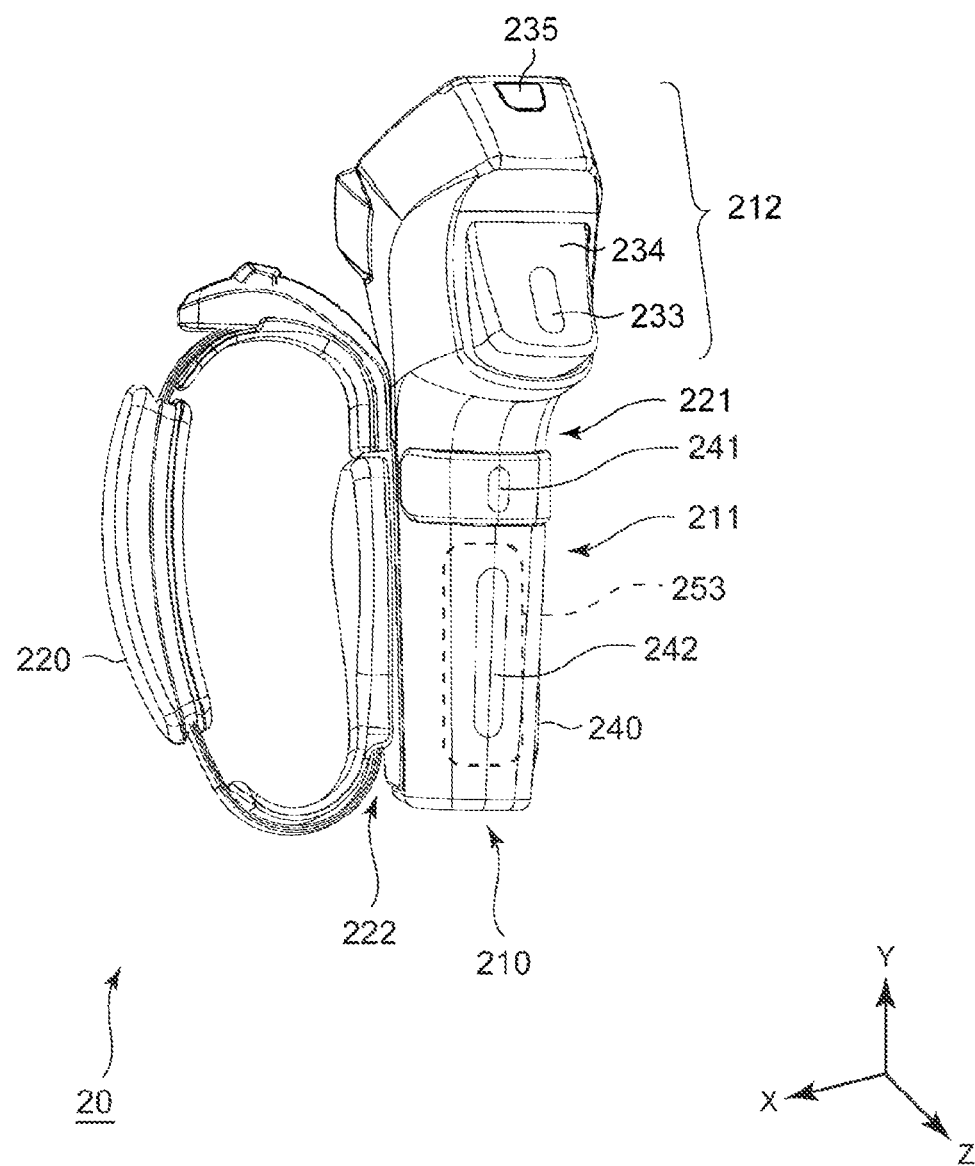
FIG. 2 is a perspective view of the console device according to the embodiment of the present invention, illustrating a rear side of the console device.

A control system 1 according to the embodiment of the present invention includes a control device 10 and a console device 20. The console device 20 is illustrated in FIGS. 1 and 2. FIG. 1 is a perspective view of the console device 20, illustrating a front side of the console device 20, and FIG. 2 is a perspective view of the console device 20, illustrating a rear side of the console device 20. According to the present embodiment, the console device 20 includes a device main body 210 and a fastening member 220 as one of the ancillary parts thereto.

The device main body 210 includes a grip 211 to be gripped by the user and a console unit 212. The grip 211 has a left side face 221 and a right side face 222, and is of a polygonal columnar shape according to the present embodiment. The console unit 212 is contiguous to the grip 211, and includes, as depicted in FIGS. 1 and 2, a thumb sensor 231 and a button console 232 on a front side thereof, and a first finger sensor 233, a rocking button 234, and a display unit 235 on a rear side thereof. A second finger sensor 241 and a third finger sensor 242 are disposed on a rear side of the grip 211.

The fastening member 220 as an ancillary part is fixed to either one of the left side face 221 and the right side face 222 of the device main body 210. A battery 240 as another ancillary part may be fixed to the other of the left side face 221 and the right side face 222. According to the present embodiment, the fastening member 220 is in the form of a flexible annular belt.

The user uses the console device 20 by inserting the index to little fingers of the user into the fastening member 220 and securing the device main body 210 in a position against the base of the thumb of the user. At this time, in the embodiment depicted in FIGS. 1 and 2, the console device 20 is secured in place with the right side face 222 thereof pressed against the palm of the user's hand. The console device 20 is of such a size that when the user grips the device main body 210 naturally, the distal phalanx of the user's thumb reaches the button console 232 on the front side of the console device 20 whereas the proximal phalanx of the user's thumb is positioned closely to the thumb sensor 231. At this time, the index finger of the user touches the rocking button 234 on the rear side of the console device 20, so that user grips the grip 211 with the palm, middle finger, ring finger, and little finger of the hand. Even If the user opens the hand from the gripping state, the console device 20 does no drop off the hand as the console device 20 is secured to the hand of the user by the fastening member 220.

The thumb sensor 231 is disposed in a position slightly beneath the position that is reached by the distal phalanx of the user's thumb and that is in the vicinity of the proximal phalanx of the user's thumb when the user grips the device main body 210 naturally. The thumb sensor 231 detects the user's thumb in a detectable range represented by a relatively wide angular range from a left side face to a right side face of the front face of the console device 20 around a direction normal to the surface of the console device 20 on its front side. The thumb sensor 231 detects the position where the thumb is detected, i.e., an angle in the above angular range, and the distance from the thumb sensor 231 to the detected thumb, and outputs detected result information including the detected items of information to the control device 10. The thumb sensor 231 may be any sensor such as a camera, an optical sensor, pyroelectric sensor, an electrostatic capacitance sensor, or the like. The button console 232 includes at least one button. When the user depresses the button, the button console 232 outputs information that identifies the depressed button to the control device 10. The button console 232 includes a tiltable operation member 232a at its center. The tiltable member 232a is an operating member that the user can tilt in any desired direction with the thumb. When the tiltable member 232a is tilted, it outputs information associated with the direction in which it is tilted and the amount by which it is tilted to the control device 10.

The rocking button 234 is a button that is swingable between a first position projecting on the rear side of the console device 20 and a second position pushed in toward the console device 20. The rocking button 234 is pushed by the index finger of the user or the like, and outputs information representing the amount by which it is pushed in to the control device 10. The rocking button 234 may specifically include a potentiometer or the like, but is not limited to the potentiometer insofar as it can detect the amount by which it is pushed in. A specific configurational example of the rocking button 234 will be described in detail later.

In the present embodiment, the rocking button 234 has the first finger sensor 233. The first finger sensor 233 detects the user's index finger in a detectable range represented by a predetermined angular range on the rear side of the console device 20 around a direction normal to the face side of the rocking button 234. The first finger sensor 233 detects the position of the index finger and the distance from the first finger sensor 233 to the index finger, and outputs detected result information including the detected items of information to the control device 10. The first finger sensor 233 may be any of various sensors including an optical sensor, etc. as with the thumb sensor 231.

According to the present embodiment, a force sense presenting device is connected to the rocking button 234. The force sense presenting device presents a force resisting the pushing in of the rocking button 234 according to an instruction input from the control device 10. Specifically, the force sense presenting device may include a motor including a rotor that rotates when the rocking button 234 is pushed in, a linear actuator including a driven member that linearly moves when the rocking button 234 is pushed in, or the like. The force sense presenting device, which includes such a motor or the like, controls the motor or the actuator to apply a force in a direction opposite rotor's rotation or driven member's movement when the rotor is rotated or the driven member is moved by the pushing in of the rocking button 234. The force sense presenting device may be of any widely known design, and will not be described in detail below.

The display unit 235 includes an LED (Light Emission Diode) capable of emitting light in multiple colors, for example. According to an instruction from the control device 10, the display unit 235 energizes the LED to emit light in an instructed mode, i.e., a mode in which the LED is turned on in an instructed color, a mode in which the LED is turned on intermittently at instructed intervals, or the like.

The second finger sensor 241 detects how close the user's middle finger is to the grip 211 of the console device 20. The second finger sensor 241 then outputs information representing the detected result to the control device 10. Similarly, the third finger sensor 242 detects how close each of the user's ring finger and little finger is to the grip 211 of the console device 20. The third finger sensor 242 then outputs information representing the detected result to the control device 10. Each of the second finger sensor 241 and the third finger sensor 242 may include an electrostatic capacitance sensor, an optical sensor, or the like. Some optical sensors have a light emitter for emitting infrared radiation and a light detector for detecting infrared radiation, and measure the ratio of infrared radiation emitted from the light emitter, reflected from an object, and applied to the light detector. With such an optical sensor, the closer the object is to the optical sensor, the larger the ratio r (referred to as specific intensity) of the intensity of infrared radiation applied to the light detector divided by the intensity of infrared radiation emitted from the light emitter is. Therefore, the distance up to the object can be measured. The optical sensor may alternatively be a sensor for measuring the distance up to an object on TOF (Time-of-Flight) principles. According to such a sensor, the distance up to an object is measured from the time spent until light emitted from a light emitter and reflected by the object is applied to a light detector.

According to the present embodiment, the console device 20 has a sensor (fastening member sensor) for detecting which one of the left side face 221 and the right side face 222 the fastening member 220 as a given ancillary part is secured to or not. Specifically, the fastening member sensor may include microswitches or the like disposed on the left side face 221 and the right side face 222, the microswitches being turned on when the fastening member 220 is installed in position. Since widely known arrangements can be used to detect a side on which a given ancillary part is installed, the fastening member sensor will not be described in detail below. According to the present embodiment, detected results from the fastening member sensor are input to the control device 10.

The device main body 210 houses in its casing a speaker 251, a microphone 252, and a main body vibrating mechanism 253. The main body vibrating mechanism 253 includes a vibration actuator or the like that vibrates the device main body 210 and transmits the vibrations to the hand of the user to which the console device 20 is secured. According to the present embodiment, in particular, the main body vibrating mechanism 253 can vibrate the device main body 210 in a plurality of directions. Specifically, the main body vibrating mechanism 253 may vibrate the device main body 210 in leftward and rightward directions (X-axis directions as depicted), upward and downward directions (Y-axis directions as depicted), and forward and rearward directions (Z-axis directions as depicted). The device main body 210 may house a plurality of main body vibrating mechanisms 253 therein.

A position tracking light-emitting device, which is separate from the display unit 235, is disposed on the surface of the casing of the console device 20. A plurality of light-emitting devices may be disposed on the surface of the casing of the console device 20. The control device 10 identifies the position of the console device 20 in a real space from the position of the light emitted from the light-emitting device.

Figure 3A:
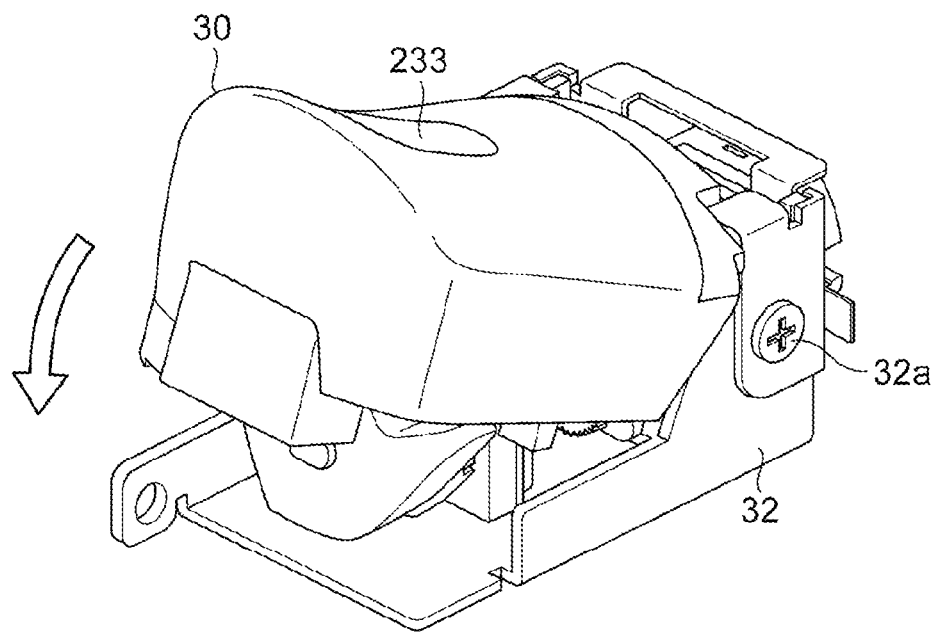
FIG. 3A is a perspective view of a rocking button of the console device according to the embodiment of the present invention, as viewed from a face side thereof.
Figure 3B:
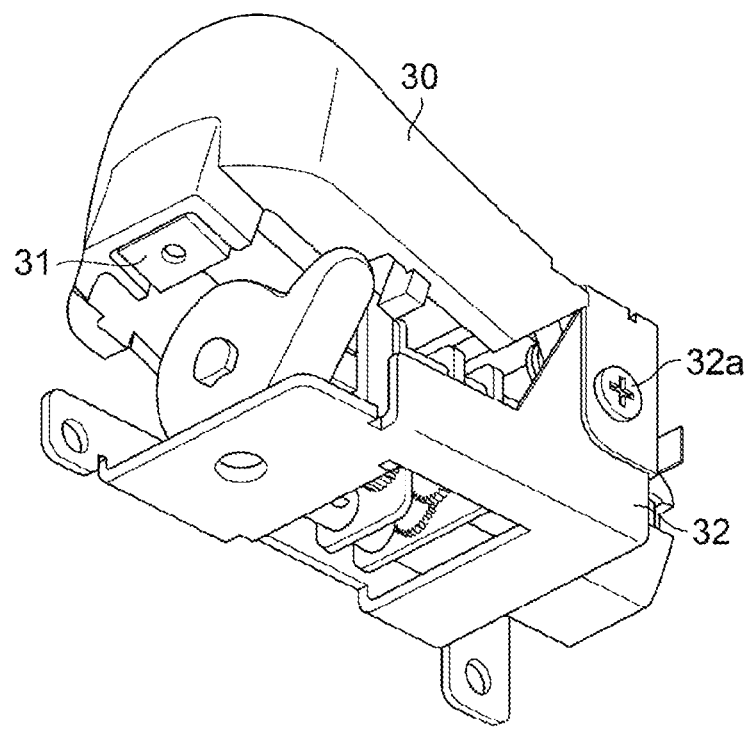
FIG. 3B is a perspective view of a rocking button of the console device according to the embodiment of the present invention, as viewed from a back side thereof.

A configurational example of the rocking button 234 will be described below with reference to FIGS. 3A and 3B. FIG. 3A is a view of the rocking button 234 as viewed from a face side thereof (a rear side of the console device 20), and FIG. 3B is a view of the rocking button 234 as viewed from a back side thereof (the console device 20 side). As depicted in FIGS. 3A and 3B, the rocking button 234 includes a movable member 30 as an object to be operated by the user, which can be pushed in by the pressure from the user's finger, a button vibrating mechanism 31 housed in the movable member 30, and a base 32 on which the movable member 30 is mounted. As depicted in FIG. 3A, the first finger sensor 233 is mounted on the surface of the movable member 30.

The movable member 30 is angularly movably mounted on the base 32 for angular movement about a rotational shaft 32a. FIGS. 3A and 3B depict the rocking button 234 in a state not operated by the user (non-operated state). In this state, the movable member 30 is in a first position remotest from the device main body 210. When the user depresses the movable member 30 with its index finger, the movable member 30 is turned about the rotational shaft 32a in a direction toward the device main body 210 as indicated by the outline arrow in FIG. 3A. As the movable member 30 continues to swing until the end thereof reaches a position (second position) abutting against the base 32, the user is unable to depress the movable member 30 anymore. The state in which the movable member 30 is depressed maximally closely to the device main body 210 will hereinafter be referred to as a maximally operated state. In other words, the movable member 30 has a movable range extending between the first position and the second position, and is turned in this range in response to a user's action. The console device 20 periodically detects the position of the movable member 30 within the movable range, and sends information representing the detected position as information representing the amount of operation that the user has performed on the rocking button 234 to the control device 10. The control device 10 is now able to grasp how much the user has operated to depress the movable member 30. The movable member 30 is normally urged by a spring or the like to return to the first position when the user moves the index finger off the movable member 30.

The button vibrating mechanism 31 includes a vibration actuator or the like that vibrates the movable member 30 of the rocking button 234. When the button vibrating mechanism 31 is actuated while the index finger of the user is in touch with the surface of the movable member 30, the vibrations of the movable member 30 are transmitted to the index finger of the user. The user now feels the vibrations only on the finger in operation, unlike when the device main body 210 vibrates in its entirety. Therefore, when the button vibrating mechanism 31 is actuated while the user is operating the rocking button 234, the user experiences a different operation feeling from when the user merely operates a button.

The button vibrating mechanism 31 should desirably produce vibrations in a direction at least along the direction in which the rocking button 234 is operated, i.e., the direction in which the movable member 30 is turned as indicated by the outline arrow in FIG. 3A. This direction is also a direction crossing the surface of the movable member 30. Since the movable member 30 is arranged to be turned in the direction in which it is operated, the vibrations produced in that direction vibrate the movable member 30 only, and the vibrations produced by the button vibrating mechanism 31 are prevented from being transmitted to the device main body 210. The rocking button 234 is thus vibrated independently of the device main body 210. The button vibrating mechanism 31 should desirably be disposed in a position spaced from the center of rotation of the movable member 30 in order to vibrate the movable member 30 efficiently. According to the present embodiment, the button vibrating mechanism 31 is disposed farther from the rotational shaft 32a than the center of the movable member 30 in its longitudinal direction, i.e., a direction perpendicular to the rotational shaft 32a as depicted in FIG. 3B.

Figure 4:
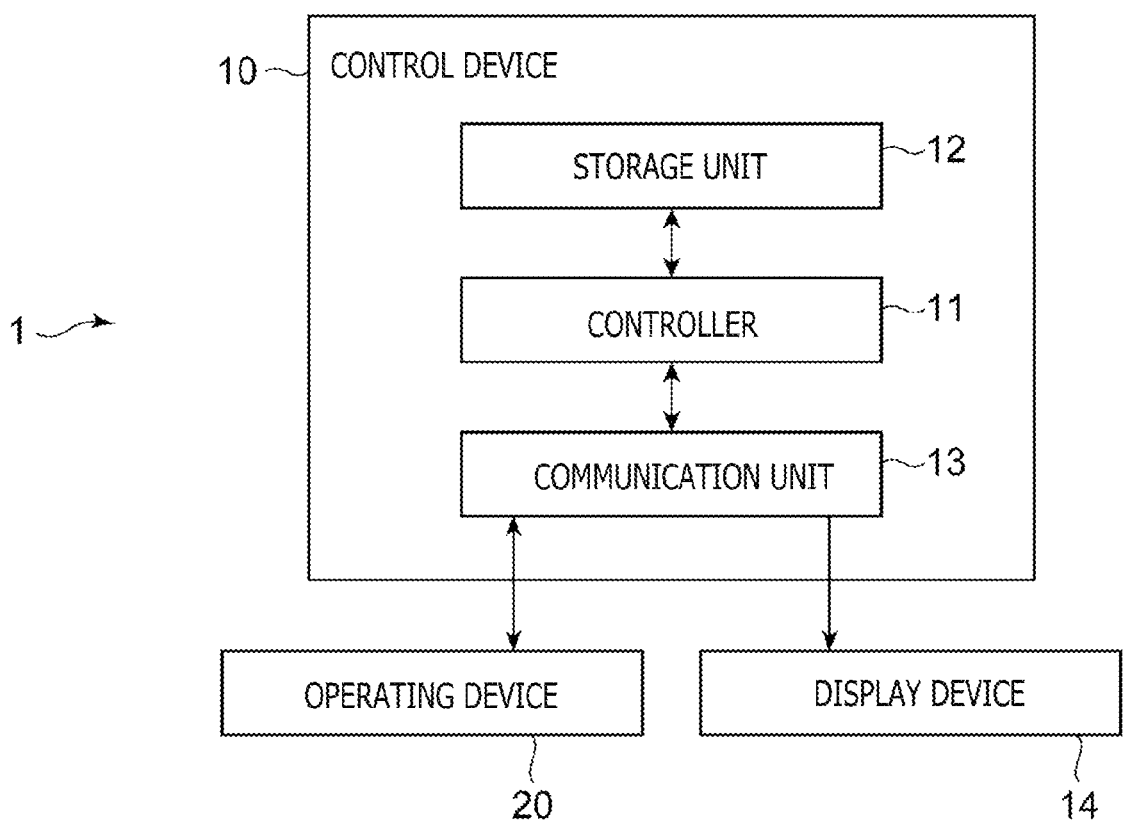
FIG. 4 is a block diagram illustrating a configurational example of a control device.

The control device 10 is an information processing device connected to the console device 20 for communication therebetween, and may include a home-use game machine, a personal computer, or the like. In the present embodiment, the control device 10 is also connected to a display device 14 for communication therebetween. As depicted in FIG. 4, the control device 10 includes a controller 11, a storage unit 12, and a communication unit 13. The controller 11 includes a program-controlled device such as a CPU (Central Processing Unit) or the like, and performs various information processes according to programs stored in the storage unit 12. Specific contents of processing sequences of the controller 11 will be described in detail later.

The storage unit 12 is a memory device or the like and holds programs to be executed by the controller 11. These programs may be computer-readable and stored in a non-transitory storage medium, and provided therefrom and copied to the storage unit 12. The storage unit 12 operates also as a work memory of the controller 11.

The communication unit 13 includes a serial interface such as USB (Universal Serial Bus) or the like or a wireless communication interface such as Bluetooth (registered trademark) or the like. The control device 10 is connected to the console device 20 for communication therebetween through the communication unit 13. According to the present embodiment, the communication unit 13 receives, from the console device 20, information representing detected results from the thumb sensor 231, the first finger sensor 233, the second finger sensor 241, and the third finger sensor 242, and information representing contents of actions that the user has made on the button console 232 and the rocking button 234. According to instructions from the controller 11, the communication unit 13 sends control commands for actuating the button vibrating mechanism 31 housed in the rocking button 234, the main body vibrating mechanism 253 in the device main body 210, etc.

Furthermore, the communication unit 13 includes a communication interface for communicating with the display device 14 through a wired link or a wireless link. The control device 10 sends data of video images to be displayed by the display device 14 to the display device 14 via the communication unit 13.

The display device 14 displays video images based on video signals sent from the control device 10. For example, the display device 14 may be a device of the type that is worn on the head of the user, such as a head-mounted display.

Figure 5:
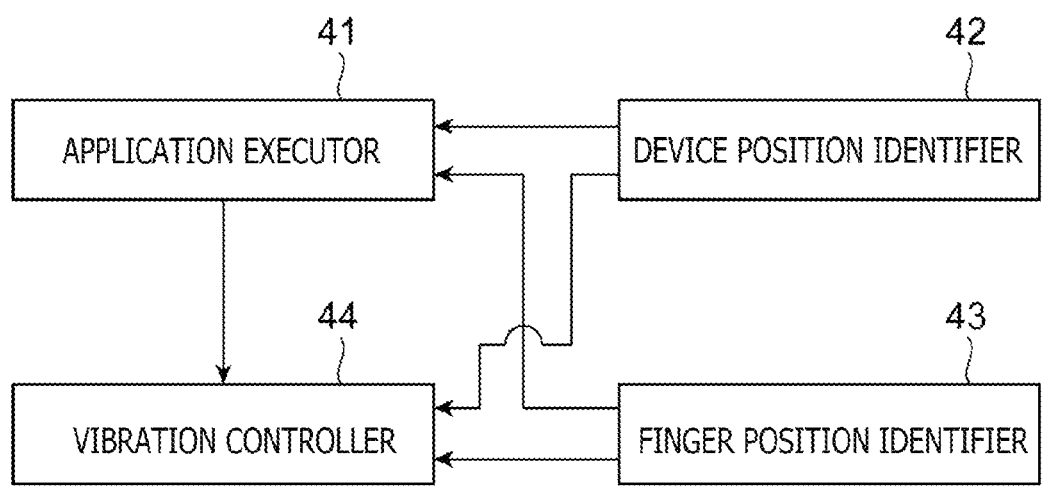
FIG. 5 is a functional block diagram illustrating functions of the control device.

Operation of the controller 11 of the control device 10 will be described below. According to the present embodiment, the controller 11 functionally includes, as depicted in FIG. 5, an application executor 41, a device position identifier 42, a finger position identifier 43, and a vibration controller 44. These functions are realized when the controller 11 operates according to the programs stored in the storage unit 12. The programs may be provided to the control device 10 via a communication network such as the Internet or the like or may be stored in and provided from a computer-readably information storage medium such as an optical disk or the like.

The application executor 41 is realized when the controller 11 executes an application program for a game or the like. The application executor 41 carries out various processing sequences depending on the contents of user's actions on the console device 20, and displays results of the processing sequences on the screen of the display device 14. For example, the application executor 41 may construct a virtual space in which various virtual objects are placed and present an image representing the state in the virtual space to the user. In addition, the application executor 41 may carry out processing sequences using the positional information of the console device 20 that is identified by the device position identifier 42 and the positional information of the finger of the user that is identified by the finger position identifier 43.

The device position identifier 42 carries out a position tracking process for the console device 20. This is a process for identifying the position of the console device 20 in a real space. Specifically, when the position tracking process for the console device 20 is started, the device position identifier 42 instructs the console device 20 to energize a light-emitting device for position tracking to emit light. Then, the device position identifier 42 controls a camera to capture an image including the console device 20, and analyzes the captured image to detect the light emitted by the light-emitting device from the captured image. Using the position of the light in the captured image, the device position identifier 42 identifies the position of the console device 20 in the real space with respect to the position where the camera is installed. The camera may be fixedly located in a room where the user uses the console device 20 or may be mounted on the display device 14. Particularly, if the display device 14 is a head-mounted display and the camera is mounted on the display device 14, then the device position identifier 42 can identify the position of the console device 20 with respect to the head of the user. By carrying out this process repeatedly, the device position identifier 42 can track the position of the hand of the user on which the console device 20 is mounted while the user is freely moving the hand.

The finger position identifier 43 identifies the positions of the user's fingers as seen from the console device 20, using the information representing the detected results from the thumb sensor 231, the first finger sensor 233, the second finger sensor 241, and the third finger sensor 242 of the console device 20. As described above, since the console device 20 is secured to the palm of the user's hand by the fastening member 220, the user does not need to keep the console device 20 gripped by its own fingers, but can move its five fingers freely to a certain extent while wearing the console device 20. The finger position identifier 43 identifies which positions these five fingers are in. Particularly, the finger position identifier 43 identifies the distance x from the surface of the movable member 30 where the first finger sensor 233 is disposed to the index finger of the user, by analyzing the detected result from the first finger sensor 233.

In response to a request from the application executor 41, the vibration controller 44 outputs control commands for actuating the button vibrating mechanism 31 and the main body vibrating mechanism 253 to the console device 20. The application executor 41 is now able to vibrate the main body of the console device 20 and the rocking button 234 depending on the situation of a game or the lie that is played. Specifically, the vibration controller 44 receives a vibration control request specifying control contents that indicate which vibration mechanism is to be vibrated in which direction to what extent, from the application executor 41. The vibration controller 44 then sends a control command having contents according to the vibration control request to the console device 20, thereby actuating the button vibrating mechanism 31 and the main body vibrating mechanism 253.

A specific example of processing sequences that are carried out by the vibration controller 44 to control the button vibrating mechanism 31 and the main body vibrating mechanism 253 of the console device 20 will be described below.

First, a process of controlling the timing to start to actuate the button vibrating mechanism 31 will be described below. In this example, the application executor 41 outputs a vibration control request including timing specifying information that specifies a timing to start vibrations by the button vibrating mechanism 31. The timing specifying information may specify a timing to start vibrations in synchronism with a timing for the user to start operating the rocking button 234. Alternatively, the timing specifying information may specify a timing to start vibrations in synchronism with a timing at which the amount of operation by the user on the rocking button 234, i.e., the amount of depression by the user of the movable member 30, reaches a predetermined target value. In this example, if the vibration controller 44 receives information associated with the amount of operation on the rocking button 234 from the console device 20, confirms that a state to start vibrations has been reached based on the received information, and then instructs the button vibrating mechanism 31 to start vibrations, then the starting of actual vibrations becomes later than the timing specified by the application executor 41. For this reason, the vibration controller 44 estimates a timing at which the user's finger, i.e., the index finger, is to operate the rocking button 234, and instructs the button vibrating mechanism 31 to start operating at a timing that is determined depending on the estimated result on the basis of the detected results from the first finger sensor 233 disposed on the surface of the movable member 30. In this manner, the button vibrating mechanism 31 starts to vibrate the movable member 30 immediately at the timing at which the amount of operation by the user has reached the target value or the timing at which the user has started to operate the movable member 30.

Figure 6:
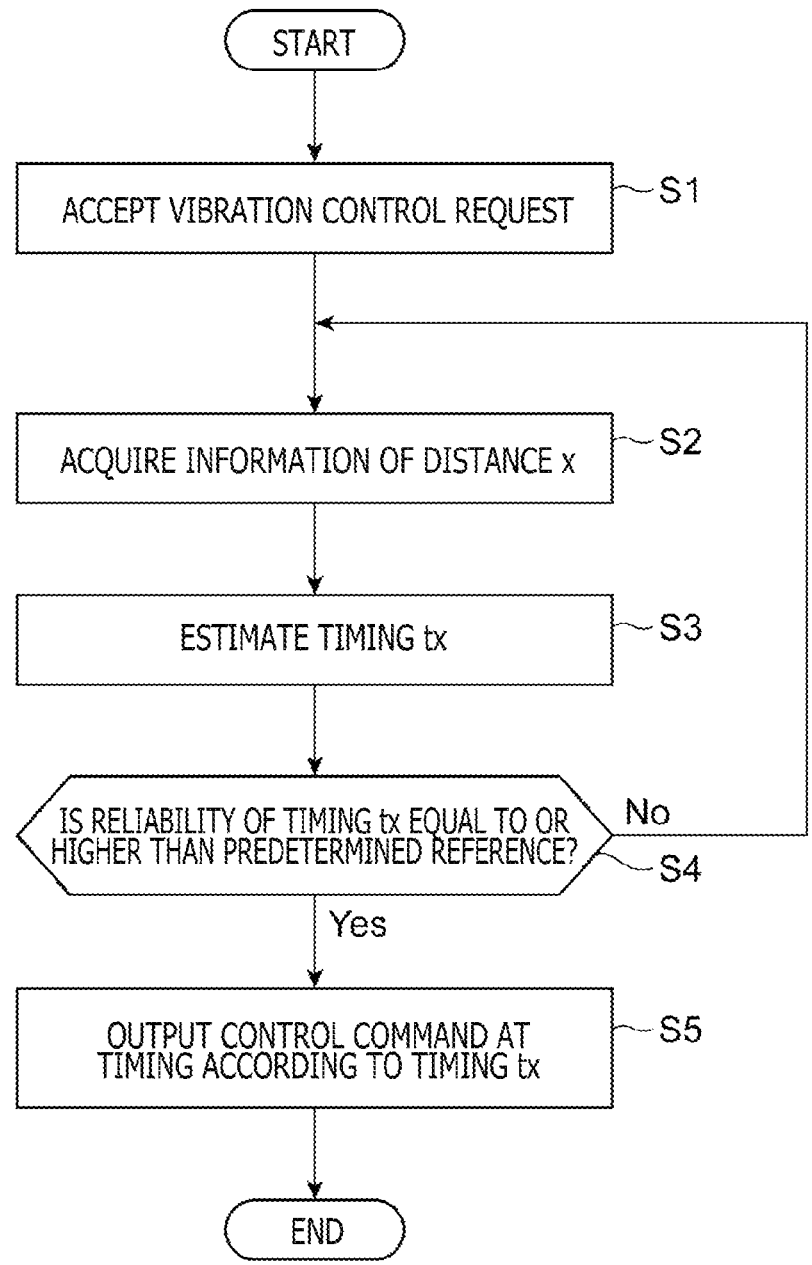
FIG. 6 is a flowchart of an example of a processing sequence carried out by the control device.

A specific example of a flow of the vibration start control process will be described below with reference to a flowchart depicted in FIG. 6. First, the vibration controller 44 receives a vibration control request including timing specifying information from the application executor 41 (step S1).

Having received the vibration control request, the vibration controller 44 periodically acquires information associated with the distance x from the movable member 30 to the user's index finger from the finger position identifier 43 (step S2). Having newly acquired the information associated with the distance x, the vibration controller 44 estimates a timing tx at which the user's index finger will reach the target position based on a plurality of items of information associated with the distance x that have been acquired so far (step S3). In a specific example, it is assumed that the vibration control request received in step S1 has specified a timing for the user to start to operate the rocking button 234. In this case, it is preferable that vibrations be started at the timing when the distance x becomes zero after the user's index finger has approached the movable member 30. Providing the distance up to the index finger is x1 at time t1, the distance at time t2 is x2, and the distance at time t3 is x3, the vibration controller 44 extrapolates these numerical values to calculate a timing tx when the distance becomes 0. In case the timing specifying information specifies a state in which the rocking button 234 has been operated to a certain extent as a target value, the vibration controller 44 may estimate a timing tx when the amount of operation will reach the target value on the assumption that the index finger approaches and contacts the surface of the movable member 30 and thereafter operates the movable member 30.

Then, the vibration controller 44 determines whether the timing tx has been estimated with a degree of reliability equal to or higher than a predetermined reference in step S3 (step S4). If the timing tx has been estimated with the degree of reliability equal to or higher than the predetermined reference, then the vibration controller 44 outputs a control command to actuate the button vibrating mechanism 31 at a timing earlier than the timing tx by a predetermined time in order that vibrations can be started upon arrival of the timing tx (step S5). The predetermined time is a time depending on a period of time required from the outputting of the control command from the vibration controller 44 until the button vibrating mechanism 31 actually starts operating. In this manner, the movable member 30 can start vibrating at the timing tx.

While the user's index finger is not close to the movable member 30, it is not possible to estimate a timing when the index finger reaches the movable member 30. If it is determined in step S4 that it is not possible to estimate a timing tx with a degree of reliability equal to or higher than the predetermined reference in step S3, then control goes back to step S2 in which the vibration controller 44 newly acquires information associated with the distance x. This process is repeated until a timing tx is estimated accurately, so that the vibration controller 44 can estimate a timing tx immediately when the user's index finger starts to become close to the movable member 30.

The example in which the timing for the button vibrating mechanism 31 to start vibrating is controlled has been described above. The vibration controller 44 may also control the timing for the main body vibrating mechanism 253 to start vibrating according to the same process. In such a case, the vibration controller 44 may estimate a timing when rather than the index finger, another finger approaches and contacts the main body of the console device 20, and may determine a timing for the main body vibrating mechanism 253 to start vibrating based on the estimated timing. A timing at which each of the fingers other than the index finger will contact the main body of the console device 20 can be estimated by the finger position identifier 43 based on the detected results from the thumb sensor 231, the second finger sensor 241, and the third finger sensor 242. The vibration controller 44 may determine timings for the button vibrating mechanism 31 and the main body vibrating mechanism 253 to start vibrating, based on not only a time-dependent change in the distance from the surface of the console device 20 to each finger, but also a time-dependent change in the amount of operation on the rocking button 234, for example. Furthermore, the vibration controller 44 may determine timings for the button vibrating mechanism 31 and the main body vibrating mechanism 253 to start vibrating, using a combination of information associated with these time-dependent changes.

An example of a control process for actuating both the button vibrating mechanism 31 and the main body vibrating mechanism 253 at the same time will be described below. In such a case, the vibration controller 44 changes control contents depending on the amount of operation on the rocking button 234. Specifically, when the rocking button 234 is in a state other than a maximally operated state, the vibration controller 44 controls the vibrating mechanisms independently of each other according to contents depending on a request from the application executor 41. On the other hand, when the rocking button 234 is in the maximally operated state, the vibration controller 44 controls the vibrating mechanisms according to control contents different from the contents of a request from the application executor 41.

Specifically, when the rocking button 234 is in the maximally operated state, the vibration controller 44 outputs control commands representing a common waveform for producing vibrations in the same direction at the same timing to the button vibrating mechanism 31 and the main body vibrating mechanism 253. This is because when the rocking button 234 is in the maximally operated state, since the movable member 30 is pressed by the user's finger and integrally combined with the device main body 210, it is difficult to vibrate the movable member 30 independently of the device main body 210. Alternatively, when the rocking button 234 is in the maximally operated state, the vibration controller 44 may output a control command to only one of the two vibrating mechanisms and may not output a control command to the other vibrating mechanism, stopping vibrations thereof. In this case, the vibration controller 44 may increase the amplitude of the vibrations of one of the two vibrating mechanisms.

In the above description, the vibration controller 44 changes control contents only when the rocking button 234 is in the maximally operated state. However, the vibration controller 44 may change control contents when the amount of operation on the rocking button 234 becomes equal to or higher than a predetermined value. When the amount of operation on the rocking button 234 is close to a maximum amount of operation, the movable member 30 may possibly collide with the base 32 if the movable member 30 is vibrated. Therefore, when the amount of operation on the rocking button 234 becomes equal to or higher than the predetermined value, the vibration controller 44 may stop issuing a control command to the button vibrating mechanism 31. Alternatively, the vibration controller 44 may perform a control process for reducing the amount of vibrations when the button vibrating mechanism 31 is vibrated. Such a control process may also be performed when there is a single vibration control request for the button vibrating mechanism 31.

Figure 7:
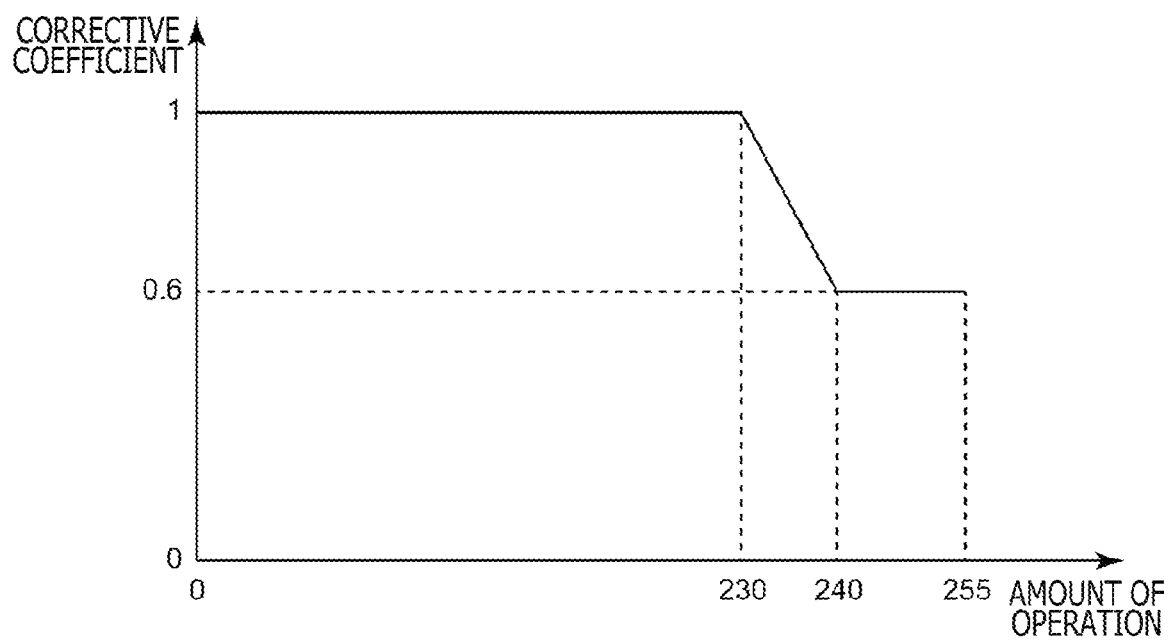
FIG. 7 is a diagram illustrating by way of example a process of determining a corrective coefficient in controlling a button vibrating mechanism.

Specifically, the vibration controller 44 determines a corrective coefficient for the amount of vibrations of the button vibrating mechanism 31 depending on the amount of operation on the rocking button 234. Then, the vibration controller 44 outputs a control command for vibrating the button vibrating mechanism 31 with the amount of vibrations corrected by the corrective coefficient. The corrective coefficient is determined according to a graph depicted in FIG. 7, for example. In the illustrated example, the amount 0 of operation corresponds to an unoperated state, and the amount 255 of operation corresponds to a maximally operated state. When the amount of operation exceeds 230, the vibration controller 44 performs a control process for restraining the amount of vibrations of the button vibrating mechanism 31, and when the amount of operation exceeds 240, the vibration controller 44 sets the corrective coefficient to 0.6. The numerical value of the corrective coefficient is determined such that noise produced by the vibrations of the button vibrating mechanism 31, i.e., chattering noise, is of a level that does not bother the user. This control process is effective to restrain noise produced by the vibrations of the button vibrating mechanism 31 regardless the operated state of the rocking button 234.

Figure 8:
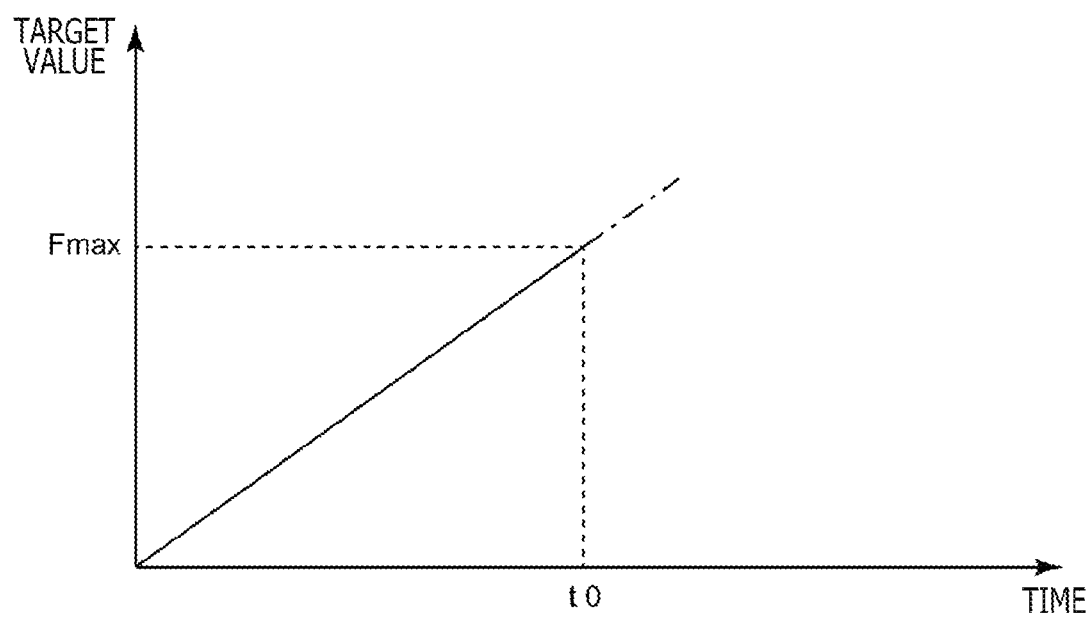
FIG. 8 is a diagram illustrating by way of example a process for controlling the button vibrating mechanism and a force sense presenting device in a ganged fashion.

An example of a process for controlling the button vibrating mechanism 31 in combination with the force sense presenting device will be described below. In this example, the vibration controller 44 controls the force sense presenting device connected to the rocking button 234 to present a force sense to the user's finger that operates the rocking button 234. In a certain situation, a target value for the strength of a force to be presented to the user may be larger than the force that can be presented by the force sense presenting device. In such a situation, the vibration controller 44 vibrates the button vibrating mechanism 31 simultaneously while the force sense presenting device is presenting a force, thereby causing the user to feel a strong force. FIG. 8 is a diagram illustrative of an outline of such a control process. In the illustrated example, the strength of the force presented by the force sense presenting device increases with time, and the vibration controller 44 vibrates the button vibrating mechanism 31 after a timing (time t0 in FIG. 8) when the output value of the force sense presenting device has reached a maximum value Fmax.

If the output of the button vibrating mechanism 31 to vibrate the rocking button 234 is considered to be not enough, then the vibration controller 44 may actuate the force sense presenting device together to apply a force to the movable member 30. The user now feels a force that only the button vibrating mechanism 31 is unable to make the user feel.

Figure 9:
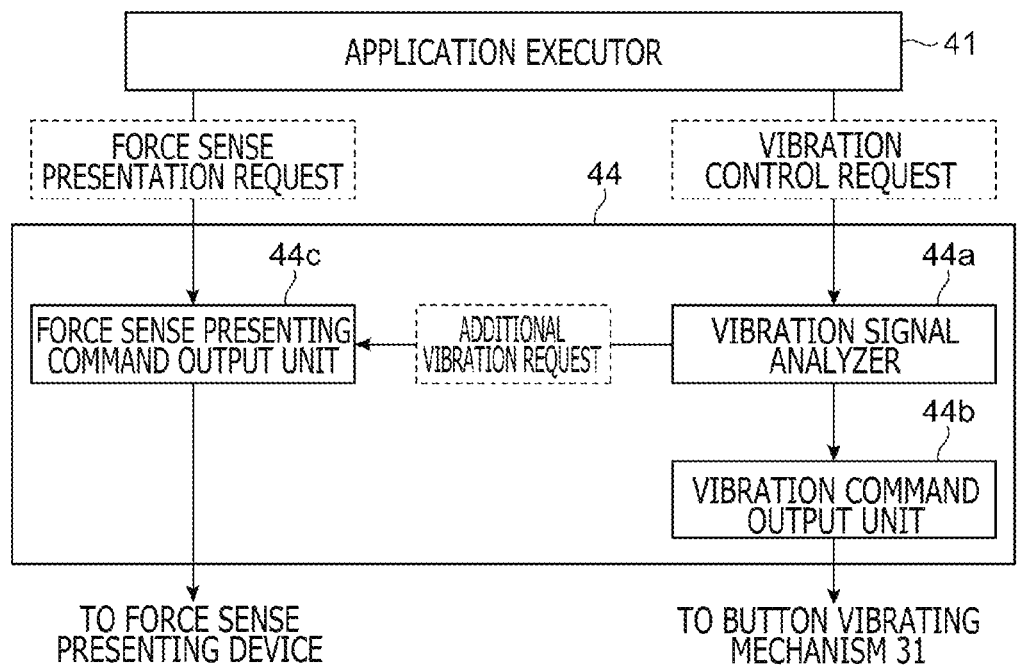
FIG. 9 is a diagram illustrating control contents for operating a plurality of devices in response to one vibration control request.

A specific example of a processing sequence carried out by the controller 11 when both the button vibrating mechanism 31 and the force sense presenting device are actuated based on a single vibration control request will be described below with reference to FIG. 9. In this example, the vibration controller 44 carries out not only the process of controlling the button vibrating mechanism 31, but also a process of controlling the force sense presenting device. The vibration controller 44 functionally includes a vibration signal analyzer 44*a*, a vibration command output unit 44*b*, and a force sense presenting command output unit 44*c*.

When a force sense presentation request is sent from the application executor 41, the force sense presenting command output unit 44*c* sends a control command for presenting a force sense depending on the contents of the request to the console device 20. Based on the control command, the force sense presenting device is controlled to present a force sense to the user.

When a vibration control request is sent from the application executor 41, the contents thereof are analyzed by the vibration signal analyzer 44*a*. The vibration control request includes waveform data representing an encoded waveform of vibrations to be generated by the button vibrating mechanism 31. The amplitude of the waveform included in the vibration data represents the intensity of the vibrations and the frequency thereof represents the period of the vibrations. The vibration data may be described in a format similar to sound data. The vibration data include a waveform of superposed vibrations having a plurality of frequencies, as with sound data. The vibration signal analyzer 44*a* analyzes the frequency and amplitude of the waveform. Specifically, the vibration signal analyzer 44*a* identifies a frequency range included in the waveform and a maximum amplitude thereof.

If the vibration signal analyzer 44*a* determines as a result of the analysis that the button vibrating mechanism 31 only is not sufficient to realize vibrations included in the vibration control request from the application executor 41, the vibration signal analyzer 44*a* sends an additional vibration request to the force sense presenting command output unit 44*c*. For example, if the vibration control request from the application executor 41 includes vibrations having a frequency equal to or higher than a predetermined frequency or vibrations having an amplitude exceeding a predetermined value, then the vibration signal analyzer 44*a* sends an additional vibration request to the force sense presenting command output unit 44*c*. The additional vibration request is a request for the force sense presenting device to present vibrations in a partial frequency range included in the vibration control request. The vibration signal analyzer 44*a* outputs a control command including a waveform of vibrations, except for the frequency range included in the additional vibration request sent to the force sense presenting command output unit 44*c*, to the vibration command output unit 44*b*. In response to the control command, the vibration command output unit 44*b* sends a control command for vibrating the button vibrating mechanism 31 to the console device 20.

In response to the additional vibration request from the vibration signal analyzer 44a, the force sense presenting command output unit 44c combines the contents thereof with the contents of the force sense presentation request received from the application executor 41, and determines final control contents for the force sense presenting device. The force sense presenting command output unit 44c then sends a control command for actuating the force sense presenting device to the console device 20 according to the combined control contents. The control command may be a command indicating a positional control process for vibrating the movable member 30 along its movable directions, about a position determined depending on the force sense presentation request from the application executor 41. In this manner, the vibration devices of different mechanisms, i.e., the button vibrating mechanism 31 and the force sense presenting device, are operated in ganged relation to present the vibrations requested by the application executor 41 to the user.

The vibration signal analyzer 44a may determine whether a vibration control request is to branch out as described above or not depending on operation modes. Specifically, if the console device 20 operates in a mode that permits a vibration branch-out according to an instruction from the user, then the vibration signal analyzer 44a determines that a vibration control request is to branch out, and outputs an additional vibration request depending on the result of the analysis of the vibration signal. Conversely, if the console device 20 operates in a mode that does not permit vibration branching-out, then the vibration signal analyzer 44a does not branch out a vibration control request, and controls the button vibrating mechanism 31 only to produce vibrations. The vibration signal analyzer 44a may cancel the branching-out of a vibration control request if the console device 20 operates in a power saver mode such as when the remaining level of energy stored in the battery of the console device 20 is low.

In the example described above, both of the button vibrating mechanism 31 and the force sense presenting device that performs positional control of the rocking button 234 are actuated based on a single vibration control request. However, the present invention is not limited to such an example. The control device 10 may control the main body vibrating mechanism 253 and a force sense presenting device for controlling movement of the device main body 210, and may branch out vibrations included in a single vibration control request to these mechanism and device.

A vibration control request specifies the contents of vibrations with waveform data representing an encoded waveform of the vibrations. However, a vibration control request may specify the contents of vibrations produced by the button vibrating mechanism 31 with other data formats. For example, a vibration control request may include data for specifying the strength and length of vibrations with numerical values or the like. If the button vibrating mechanism 31 includes an eccentric motor or the like, then a vibration control request may include a voltage signal or the like to be applied to the button vibrating mechanism 31. In this case, the vibration signal analyzer 44a determine whether a vibration control request is to branch out or not depending on whether the strength of vibrations specified by the vibration control request exceeds a predetermined threshold value or not. In this example, an additional vibration request may be a request for producing vibrations whose strength depends on the difference between the specified strength of vibrations and the threshold.

An example of a process for controlling vibrations of the main body vibrating mechanism 253 will be described below. Specifically, a control process depending on which one of the left and right hands the user is wearing the console device 20 on will be described below. As described above, the main body vibrating mechanism 253 can vibrate the device main body 210 in the leftward and rightward directions. The application executor 41 may vibrate the device main body 210 in a manner to enable the user to feel a force applied in a direction toward the palm of the hand. Conversely, the application executor 41 may vibrate the device main body 210 in a manner to enable the user to feel a force applied in a direction away from the palm of the hand. The vibration controller 44 changes the contents of a control command for the main body vibrating mechanism 253 depending on which one of the left and right hands the user is wearing the console device 20 on.

Prior to the above control process, the vibration controller 44 needs to identify which hand the user is wearing the console device 20 on. According to the present embodiment, the fastening member 220 can be fixed to either one of the left side face 221 and the right side face 222, and the console device 20 has a sensor for detecting which one of the left side face 221 and the right side face 222 the fastening member 220 is secured to, as described above. The vibration controller 44 can identify the side to which the fastening member 220 is secured by referring to the detected result from the sensor. If the fastening member 220 is secured to the right side face 222, then the vibration controller 44 determines that the user is wearing the console device 20 on the right hand, and if the fastening member 220 is secured to the left side face 221, then the vibration controller 44 determines that the user is wearing the console device 20 on the left hand. Though the vibration controller 44 determines which hand the user is wearing the console device 20 on depending on the position where the fastening member 220 is mounted, the vibration controller 44 is not limited to such a determining process, but may identify the left or right hand of the user that is wearing the console device 20 according to any of various other processes. For example, the console device 20 may have sensors such as proximity sensors or the like for detecting the palms of the user's hands, and may determine which hand the user is wearing the console device 20 on depending on the detected result from the sensors.

The vibration controller 44 receives a vibration control request including the designation of the direction toward the palm of the hand or the direction opposite the direction toward the palm of the hand from the application executor 41. The vibration controller 44 determines the direction in which to vibrate the main body vibrating mechanism 253, using the information representing which hand the user is wearing the console device 20 on. Specifically, if the user is wearing the console device 20 on the right hand and the vibration controller 44 receives a vibration control request including the designation of the direction toward the palm of the hand, then the vibration controller 44 vibrates the main body vibrating mechanism 253 to apply a force in a positive X-axis direction, and if the vibration controller 44 receives a vibration control request including the designation of the direction opposite the direction toward the palm of the hand, then the vibration controller 44 vibrates the main body vibrating mechanism 253 to apply a force in a negative X-axis direction. If the user is wearing the console device 20 on the left hand, then the vibration controller 44 vibrates the main body vibrating mechanism 253 to apply a force in a direction which is the reverse of the positive or negative X-axis direction in which the force is applied when the user is wearing the console device 20 on the right hand. In this manner, the user can sense vibrations on the palm of the hand in the same manner regardless of which one of the left and right hand the user is wearing the console device 20 on.

Another example of a process for controlling vibrations of the main body vibrating mechanism 253 will be described below. In this example, providing the vibration controller 44 determines that the console device 20 is in a predetermined state, the vibration controller 44 increases the vibrations of the main body vibrating mechanism 253. Specifically, if the user opens the hand without gripping the console device 20 or if the user directs down the palm of the hand which is wearing the console device 20, then since the console device 20 is not held in intimate contact with the palm of the hand, the user tends to sense the vibrations of the main body vibrating mechanism 253 weakly. If the vibration controller 44 determines that the vibrations of the console device 20 are hard to transmit to the user in this fashion, the vibration controller 44 controls the main body vibrating mechanism 253 to produce vibrations whose amplitude is larger than a value determined according to the vibration control request from the application executor 41. The vibrations can thus be definitely transmitted to the user depending on the state of the console device 20.

In this example, the vibration controller 44 determines whether the console device 20 is in the predetermined state or not based on the detected results of various sensors mounted on the console device 20. For example, if the finger position identifier 43 determines that a plurality of fingers of the user are held in contact with the console device 20, then the vibration controller 44 determines that the user is gripping the console device 20, and if the finger position identifier 43 determines that a plurality of fingers of the user are spaced from the console device 20, then the vibration controller 44 determines that the user is opening the hand and there is a need to increase the vibrations. If the console device 20 incorporates an attitude sensor such as an acceleration sensor or the like, then the vibration controller 44 may determine that the user is directing down the palm of the hand from the orientation of the console device 20 that is identified based on the detected result of the attitude sensor.

An example of a control process for the user to use two console devices 20 with the left and right hands simultaneously will be described below. In the example described below, the user is wearing console devices 20 on its respective left and right hands, and the control device 10 is connected to these two console devices 20 for communication therebetween.

If the vibration controller 44 determines that the two console devices 20 are contacting each other, the vibration controller 44 changes control contents for the main body vibrating mechanisms 253 for the respective console devices 20. Specifically, the vibration controller 44 changes control contents depending on the direction in which the two console devices 20 are in contact with each other. More specifically, if the two console devices 20 are in contact with each other in the same direction, then the vibration controller 44 outputs control commands having a common waveform for vibrating the console devices 20 in the same direction. Conversely, if the two console devices 20 are in contact with each other in the opposite directions, then an attempt to vibrate them with a common waveform will have them vibrate in inverted phase with each other, and their vibrations will cancel each other. Therefore, the vibration controller 44 outputs a control command for vibrating one of the console devices 20 in the opposite direction by inverting the phase of the waveform for that console device 20. In this manner, the two console devices 20 can be vibrated in the same manner. If the two console devices 20 are contacting each other, then the vibration controller 44 may cancel a control command for the main body vibrating mechanism 253 for one of the console devices 20 and may vibrate only the other console device 20. In this case, the vibration controller 44 may output a control command to the main body vibrating mechanism 253 for the other console device 20 to produce vibrations having a larger amplitude than if the console devices 23 are not in contact with each other. Furthermore, if the two console devices 20 are contacting each other or are close to each other within a predetermined distance, then the vibration controller 44 may cancel control commands for the main body vibrating mechanisms 253 for both the console devices 20 to restrain vibrations thereof.

Prior to the above control process, the vibration controller 44 determines whether the two console devices 20 are in contact with each other and, if they are in contact with each other, which direction they are contacting each other in, using the identified result from the device position identifier 42. The vibration controller 44 may determine a contact state of the two console devices 20 from a sound signal obtained from the microphone 252. Specifically, the vibration controller 44 may determine that the two console device 20 are contacting each other when the sound signal obtained from the microphone 252 contain noise produced by a contact between the two console devices 20.

A second example of a control process for the user to use two console devices 20 with the left and right hands simultaneously will be described below in terms of a situation where the console devices 20 are used to manipulate virtual objects in a virtual space. In the example described below, the application executor 41 places, in a virtual space, virtual objects (a right hand object R and a left hand object L) corresponding to each of the hands of the user, and a target object T to be manipulated by the right hand object R and the left hand object L. The application executor 41 moves the right hand object R in the virtual space and changes its shape in interlinked relation to the position, identified by the device position identifier 42, of the console device 20 worn on the right hand of the user and the positions, identified by the finger position identifier 43, of the fingers of the right hand of the user. Similarly, the application executor 41 controls the left hand object L in interlinked relation to the position of the console device 20 worn on the left hand of the user and the positions of the fingers of the left hand of the user. The user can thus manipulate the right hand object R and the left hand object L to touch and hold the target object T in the virtual space by moving the hands and fingers of the user while wearing the console devices 20.

In the above situation, the application executor 41 manages, as flag information, information associated with whether each of the right hand object R and the left hand object L is touching the target object T. The application executor 41 outputs vibration control requests for vibrating the main body vibrating mechanisms 253 and the button vibrating mechanisms 31 of the respective console devices 20 in order to present to the user tactile senses in touching and holding the target object T. Specifically, when the target object T hits another object, causing vibrations, the application executor 41 determines which one of the right hand object R and the left hand object L is contacting the target object T by referring to the flag information. The application executor 41 then outputs a vibration control request for transmitting vibrations to the console device 20 that corresponds to the hand which is in contact with the target object T. In response to the vibration control request, the vibration controller 44 outputs a control command or control commands to the main body vibrating mechanism 253 and/or the button vibrating mechanism 31 of the console device 20 to which the vibration control request is directed.

Figure 10:
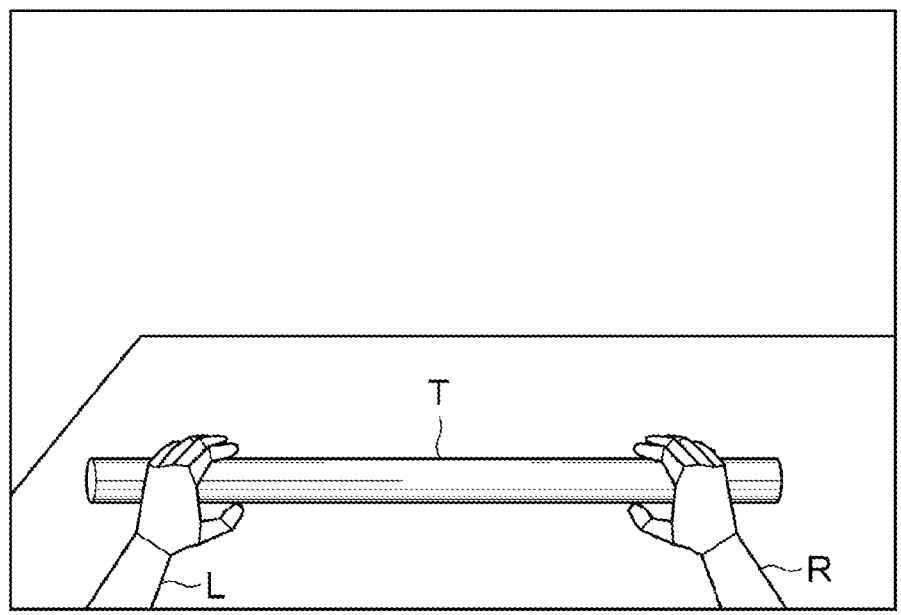
FIG. 10 is a diagram illustrating the manner in which a virtual object placed in a virtual space is operated.

If both the right hand object R and the left hand object L are in contact with the same target object T, then the vibration controller 44 may vibrate the two console devices 20 simultaneously. FIG. 10 illustrates the manner in which the right hand object R and the left hand object L are simultaneously holding one target object T in the virtual space. In this case, the application executor 41 determines directions and magnitudes of vibrations to be transmitted to the respective hands depending on the vibrations produced on the target object T. At this time, the application executor 41 may determine the degree to which vibrations are to be transmitted by referring to information representing predetermined properties such as the rigidity and material of the target object T. For example, if the target object T is an object indicating a soft material, then vibrations are hard to transmit therefrom, and if the target object T is an object indicating a hard material such as metal or the like, then strong vibrations tend to transmit therefrom. Depending on the determined degree, the application executor 41 outputs vibration control requests to the console device 20 that the user is wearing on the right hand and the console device 20 that the user is wearing on the left hand. In response to the vibration control request, the vibration controllers 44 output control commands for vibrating the main body vibrating mechanisms 253 to the respective console devices 20. The user is now able to experience a feeling as if the user is holding one object with both hands though the user is wearing the different console devices 20 on the respective left and right hands.

Specific examples of a processing sequence that the application executor 41 carries out based on the identified result from the finger position identifier 43, indicating that the finger position identifier 43 has identified the position of the index finger of the user. According to the present embodiment, the first finger sensor 233 is disposed on the surface of the rocking button 234 as described above. The application executor 41 may receive both the detected result from the first finger sensor 233 and the amount of operation by the user on the rocking button 234, i.e., the amount of depression by the user of the movable member 30, as information representing the contents of operation by the user on the rocking button 234. In this manner, it is possible to realize a processing sequence depending on the operation of the user, which cannot be realized if only the amount of depressing operation by the user on the rocking button 234 is used. Specific examples of such a processing sequence will be described below.

As a first example, a processing sequence in which the user does not operate the rocking button 234, i.e., the amount of depression of the rocking button 234 is 0, but the user has kept the index finger in contact with the rocking button 234 will be described below. In this example, it is determined that the user has kept the index finger in contact with the surface of the rocking button 234 from the identified result from the finger position identifier 43. Specifically, if the finger position identifier 43 detects that the distance x from the first finger sensor 233 to the user's index finger is x=0, it is determined that the user has kept the index finger in contact with the rocking button 234.

While the user is operating the rocking button 234, the distance x may be x=0. When the distance x=0 and the amount of depression of the rocking button 234 is 0, the console device 20 is in a state in which the user is about to operate the rocking button 234 with the index finger thereon. If the console device 20 is in such a state, the application executor 41 performs a processing sequence depending on this operated state, such as for displaying a predetermined guidance image on the screen of the display device 14. Specifically, the application executor 41 may perform a processing sequence for notifying the user in advance, of an event that will occur when the user depresses the rocking button 234. The user is thus able to know what will happen if the user operates the rocking button 234 before the user actually operates the rocking button 234.

In the above description, a guidance image or the like is displayed at the timing of the distance x=0. However, the present embodiment is not limited to such a case. The application executor 41 may perform any of various processing sequences when the distance x is equal to or smaller than a predetermined threshold value. When the distance x is equal to or smaller than a predetermined threshold value, the user's index finger is in the proximity of the rocking button 234, and it can be estimated that the user is about to operate the rocking button 234.

A second example in which a value calculated based on both information associated with the position of the index finger identified by the finger position identifier 43 and information associated with the amount of depression of the rocking button 234 is received as an input value of user's operation. It is assumed that the amount of depression of the rocking button 234 may be of a value in the range from 0 to 255, for example. Specifically, when the rocking button 234 is not operated, the amount of depression is 0, and when the rocking button 234 is maximally operated, the amount of depression is 255. If only information associated with the amount of depression of the rocking button 234 is used, then the amount of operation by the user is expressed in 256 steps ranging from 0 to 255 steps.

In the second example, the application executor 41 uses the distance x up to the position of the index finger identified by the finger position identifier 43 as information representing the amount of depression of the rocking button 234 and the amount of operation by the user. Specifically, when the distance x is equal to or greater than a predetermined threshold value Th, the amount of operation is 0, and when the user brings the index finger closer to the rocking button 234 from the threshold value Th, the user is regarded as having started to operate the rocking button 234 at that time. Using the distance x, the amount a of operation by the user is expressed by:

$$a = c(Th-x) \ (0 \leq x \leq Th)$$

where c represents a predetermined coefficient. For example, the coefficient c is determined such that c·Th is 256. The amount of operation is 0 when the user has its index finger spaced from the rocking button 234 by the distance Th or greater. The amount of operation increases as the index finger moves closer to the rocking button 234. The rocking button 234 is regarded as being operated by the amount of operation which is 256 when the user has brought the index finger into contact with the rocking button 234.

When the user further operates to depress the rocking button 234, a numerical value representing the amount of depression is added to the amount a of operation. If the amount of depression is indicated p, then the overall amount a of operation by the user is calculated by the following equation:

$$a = c(Th-x) + p \ (0 \leq x \leq Th)$$

When the user depresses the rocking button 234 to the maximally operated state, since p=255, the amount a of operation becomes 511.

Figure 11:
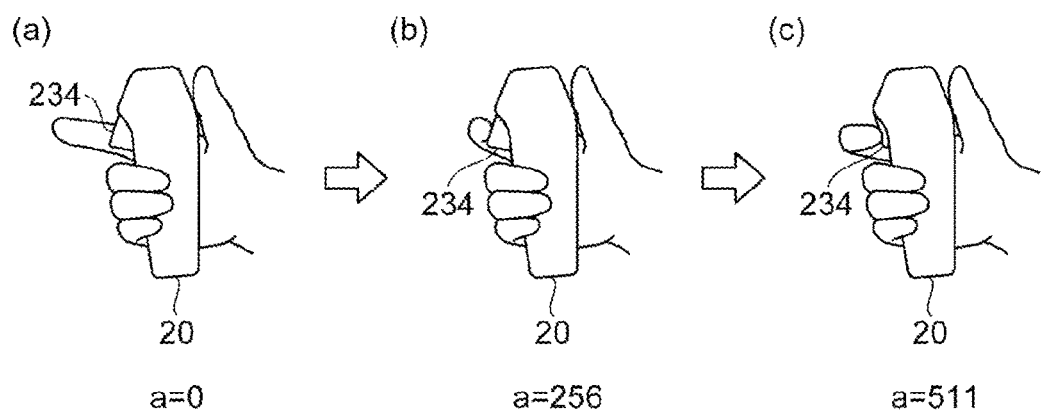
FIG. 11 is a set of views depicting the relationship between user's actions and amounts of operation in an example where detected results from a finger sensor and amounts of depression of a rocking button are combined.

By thus using the amount of depression of the rocking button 234 and the distance x up to the rocking button 234 in combination with each other, it is possible to acquire the amount of operation by the user in a wider dynamic range than if only the amount of depression is used. FIG. 11 is a set of views depicting the relationship between user's actions and amounts of operation in this example. FIG. 11(a) depicts a state in which the index finger is spaced from the rocking button 234 by the distance Th or greater. In this state, the amount of operation is a=0. FIG. 11(b) depicts a state in which the index finger is in contact with the surface of the rocking button 234 and has not depressed the rocking button 234. In this state, since the distance is x=0 and the amount of depression is p=0, the amount of operation is a=c·Th=256. FIG. 11(c) depicts a maximally operated state in which the rocking button 234 is depressed by a maximum amount. In this state, since the amount of depression is p=255, the amount of operation is a=511.

With the control system 1 according to the embodiment described above, when the button vibrating mechanism 31 housed in the rocking button 234 is vibrated, it presents unique vibrations to the user's finger that is about to operate the rocking button 234. Furthermore, many various types of vibrations can be presented to the user by vibrating the button vibrating mechanism 31 and the main body vibrating mechanism 253 which are incorporated in one console device 20 and controlling the vibrating mechanisms which are incorporated in two console devices 20.

The present invention is not limited to the above embodiment. In the above description, the device position identifier 42 performs position tracking of the control device 20 by capturing, with a camera, an image of light emitted from the light-emitting device of the control device 20. The position tracking is not limited to such a process. If the console device 20 incorporates a motion sensor such as an acceleration sensor, an acceleration sensor, or the like, then the device position identifier 42 may use the detected result from the motion sensor for position tracking. While the display device 14 is a head-mounted display in the above description, the display device 14 is not limited to such a display, but may be a stationary device such as a home-use television receiver or the like.

In the above description, the button vibrating mechanism 31 is mounted in the rocking button 234 where the amount of depression can be detected. However, various other operating buttons may incorporate button vibrating mechanisms for vibrating those operating buttons, so that unit vibrations can be presented to not only the index finger, but also various fingers that operate the operating buttons.

Figure 12:
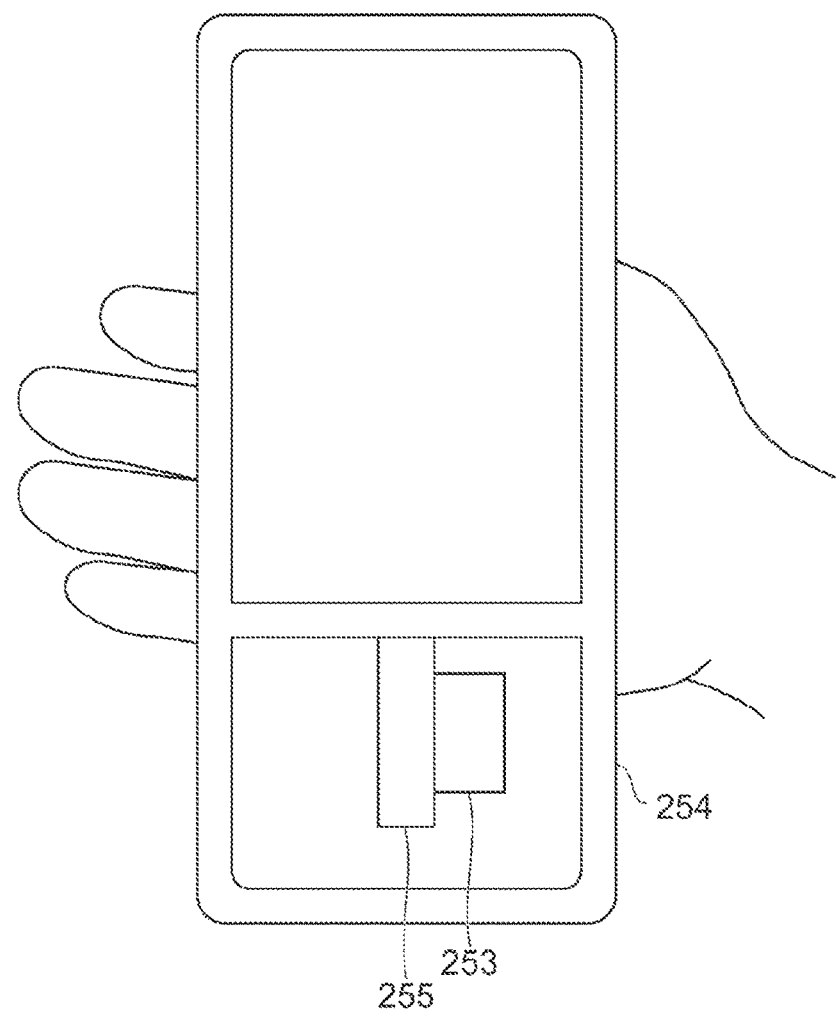
FIG. 12 is a view schematically illustrating an example of the layout of a main body vibrating mechanism.

In the above description, the main body vibrating mechanism 253 is fixedly disposed in the casing of the device main body 210. However, the main body vibrating mechanism 253 may be mounted on a less rigid member than the casing of the device main body 210 which the palm of the user's hand is in direct contact with. FIG. 12 is a view schematically illustrating the structure of the device main body 210 in which the main body vibrating mechanism 253 is disposed in the above manner.

In the example depicted in FIG. 12, the casing of the device main body 210 includes a first member 254, and a separate second member 255 is mounted on and protrudes from the first member 254. The second member 255 may be of sheet metal and is less rigid than the first member 254. When the user wears the console device 20, the body of the user, i.e., the palm of the hand, contacts a portion of the first member 254. In this example, the main body vibrating mechanism 253 includes a vibration actuator or the like and is fixed to the second member 255. When the main body vibrating mechanism 253 is vibrated, its vibrations are transmitted from the second member 255 through the first member 254 to the user. With this arrangement, when the main body vibrating mechanism 253 is actuated, it is less likely to cause internal mechanical collisions or bumps than if the main body vibrating mechanism 253 is directly fixed to the first member 254. Therefore, the main body vibrating mechanism 253 can be actuated to produce high output power.

In the above description, the control device 10, which is separate from and independent of the console device 20, identifies the contents of operation by the user and the positions of the fingers of the user, and outputs control commands for the button vibrating mechanism 31 and the main body vibrating mechanism 253 depending on the identified control contents and positions. However, the present invention is not limited to such an arrangement. Part or all of the processing sequences carried out by the control device 10 in the above description may be performed by a control device such as a microcomputer or the like that is incorporated in the console device 20.

REFERENCE SIGNS LIST

1 Control system, 10 Control device, 11 Controller, 12 storage unit, 13 Communication unit, 14 Display device, 20 Console device, 30 Movable member, 31 Button vibrating mechanism, 32 Base, 41 Application executor, 42 Device position identifier, 43 Finger position identifier, 44 Vibration controller, 210 Device main body, 211 Grip, 212 Console unit, 220 Fastening member, 221 Left side face, 222 Right side face, 231 Thumb sensor, 232 Button console, 233 First finger sensor, 234 Rocking button, 235 Display unit, 240 Battery, 241 Second finger sensor, 242 Third finger sensor, 251 Speaker, 252 Microphone, 253 Main body vibrating mechanism

The invention claimed is:

1. An apparatus, comprising:
 a control unit;
 an operating device including: (i) an operation button to be activated by touch of a user, (ii) a first vibration mechanism for vibrating the operation button, and (iii) a second vibration mechanism for vibrating a main body of the operating device;
 a proximity sensor configured to detect when a portion of a body of the user approaches a surface of the operation button, wherein
 the control unit controls the first vibration mechanism and the second vibration mechanism,
 the control unit determines a time to start vibration, which causes the first vibration mechanism to produce vibrations depending on a detected result from the proximity sensor, where the time to start vibration is determined by:
 (i) periodically acquiring distance information regarding a distance from the operation button to a finger of the user,
 (ii) estimating a timing at which the finger of the user will reach the operation button,
 (iii) repeating the acquiring and estimating processes a number of times, and (iv) extrapolating the distance and estimated timing obtained over the number of times to compute the time to start vibration.

2. The apparatus of claim 1, wherein the control unit independently controls the first vibration mechanism and the second vibration mechanism.

3. The apparatus according to claim 1, wherein the first vibration mechanism vibrates the operation button along a direction in which the user moves the operation button.

4. The apparatus according to claim 1, wherein said control unit changes characteristics of vibration from the first vibration mechanism depending on an amount of movement of the operation button by the user and/or a position of the operation button.

5. The apparatus according to claim 4, wherein said control unit commands the vibration from the first vibration mechanism only when the amount of movement of the operation button by the user has met or exceeded a predetermined threshold.

6. The apparatus according to claim 4, wherein said control unit commands vibrations from both the first vibration mechanism and the second vibration mechanism when the amount of movement of the operation button by the user has reached a predetermined position.

7. The apparatus according to claim 4, wherein said control unit commands vibrations from both the first vibration mechanism and the second vibration mechanism when the amount of movement of the operation button by the user has reached a maximum position.

8. The apparatus according to claim 4, wherein said control unit commands an increased vibration from only one of the first vibration mechanism and the second vibration mechanism when the amount of movement of the operation button by the user has reached a maximum position.

9. The apparatus according to claim 1, wherein said control unit carries out a predetermined processing sequence when the user brings a finger into contact with a surface of the operation button and does not move the operation button.

10. The apparatus according to claim 1, further comprising a force sense presenting device configured to perform positional control on the operation button and present a force sense to the user as the user moves the operation button.

11. The apparatus according to claim 1, wherein the control unit is responsive to a single vibration control request for actuating both the first vibration mechanism and the force sense presenting device based on a vibration control request.

12. A method of controlling an operating device including: (i) an operation button to be activated by touch of a user, (ii) a first vibration mechanism for vibrating the operation button, and (iii) a second vibration mechanism for vibrating a main body of the operating device, the method comprising:
  detecting when a portion of a body of the user approaches a surface of the operation button via a proximity sensor;
  controlling the first vibration mechanism and the second vibration mechanism,
  determining a time to start vibration, which causes the first vibration mechanism to produce vibrations depending on a detected result from the proximity sensor, where the time to start vibration is determined by:
  (a) periodically acquiring distance information regarding a distance from the operation button to a finger of the user,
  (b) estimating a timing at which the finger of the user will reach the operation button,
  (c) repeating the acquiring and estimating processes a number of times, and
  (d) extrapolating the distance and estimated timing obtained over the number of times to compute the time to start vibration.

13. A non-transitory, computer readable storage medium containing a program, which when executed by a computer, causes the computer to control an operating device including: (i) operation button to be activated by touch of a user, (ii) a first vibration mechanism for vibrating the operation button, and (iii) a second vibration mechanism for vibrating a main body of the operating device, the method comprising:
  detecting when a portion of a body of the user approaches a surface of the operation button via a proximity sensor;
  controlling the first vibration mechanism and the second vibration mechanism,
  determining a time to start vibration, which causes the first vibration mechanism to produce vibrations depending on a detected result from the proximity sensor, where the time to start vibration is determined by:
  (a) periodically acquiring distance information regarding a distance from the operation button to a finger of the user,
  (b) estimating a timing at which the finger of the user will reach the operation button,
  (c) repeating the acquiring and estimating processes a number of times, and
  (d) extrapolating the distance and estimated timing obtained over the number of times to compute the time to start vibration.

* * * * *